Sept. 14, 1965　　　　　　　A. GOETZ　　　　　　　3,206,591
ANALYZER FOR PARTICLE SPECTROMETER CHARTS
Filed Dec. 5, 1960　　　　　　　　　　　　　　3 Sheets-Sheet 1

INVENTOR.
ALEXANDER GOETZ
BY Lyon & Lyon
ATTORNEYS

Sept. 14, 1965  A. GOETZ  3,206,591
ANALYZER FOR PARTICLE SPECTROMETER CHARTS
Filed Dec. 5, 1960  3 Sheets-Sheet 2

INVENTOR.
ALEXANDER GOETZ
BY
Lyon+Lyon
ATTORNEYS

Sept. 14, 1965  A. GOETZ  3,206,591
ANALYZER FOR PARTICLE SPECTROMETER CHARTS
Filed Dec. 5, 1960  3 Sheets-Sheet 3
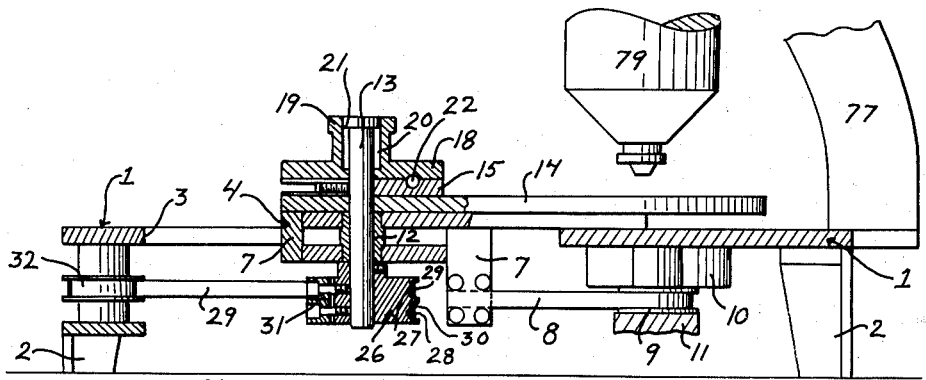
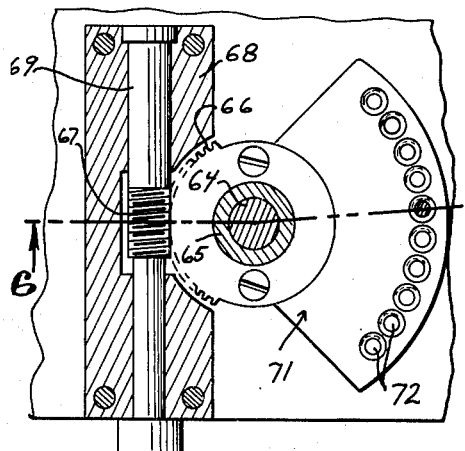
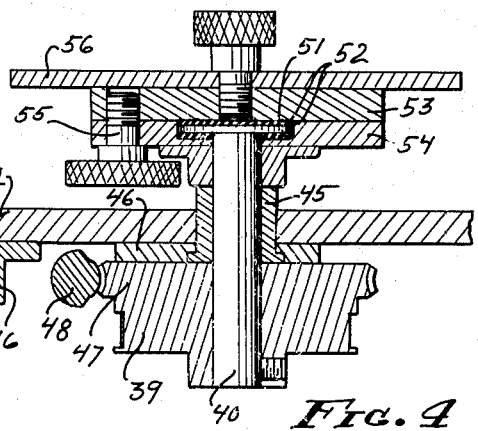
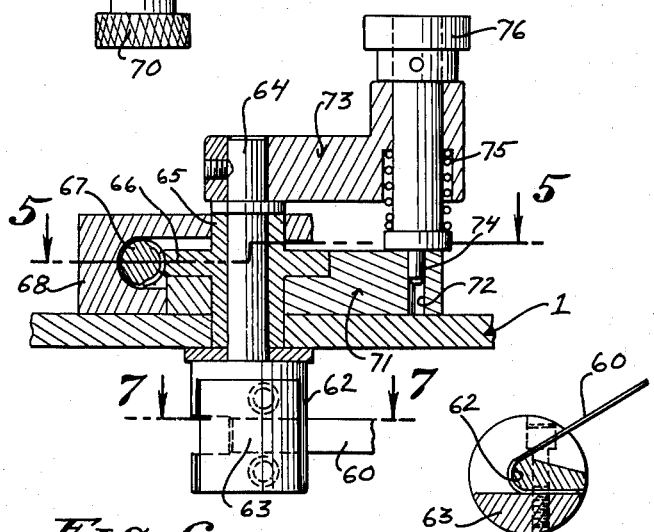
INVENTOR.
ALEXANDER GOETZ
BY Lyon Lyon
ATTORNEYS United States Patent Office 3,206,591
Patented Sept. 14, 1965

3,206,591
ANALYZER FOR PARTICLE SPECTROMETER CHARTS
Alexander Goetz, Altadena, Calif., assignor to California Institute Research Foundation, Pasadena, Calif., a corporation of California
Filed Dec. 5, 1960, Ser. No. 73,607
9 Claims. (Cl. 235—61.6)

This invention relates to analyzers for particle spectrometer charts; that is, to the type of chart produced by the apparatus disclosed in my copending-application Serial No. 759,680, now Pat. No. 3,074,627 filed September 9, 1958, Means and Method of Separating Particles from Fluids.

Included in the object of this invention are:

First, to provide an analyzer for special charts, the charts being initially in the form of a cone frustrum and wherein the information contained thereon defines one or more helical paths or bands, so that upon splitting and flattening the cone frustrum to form an arcuate chart the paths define sections of one or more Archimedean spirals.

Second, to provide an analyzer which incorporates novel means for effecting simultaneous rotation and translation of the chart whereby a microscope objective focused on any particular point with respect to the margin of a selected band generates a line parallel to said margin as said chart is moved under said eyepiece, thereby to facilitate analysis of the inforamtion thereon.

Third, to provide an analyzer of this type which incorporates means whereby the chart may be readily and quickly shifted from one band to the other while maintaining the point of focus in fixed relation to the corresponding margin of the selected band.

Fourth, to provide an analyzer of this type which incorporates means for insuring travel of said chart along preselected lines with respect to the microscope objective; that is, lines varying by preselected amounts from the margins of the band containing information, and which also incorporates means for adjustment between said lines.

Fifth, to provide an analyzer of this type which incorporates means for measuring and indicating distances along said bands.

Sixth, to provide an analyzer of this type wherein the lines of travel of the chart with respect to the microscope objective are geometrically predictable and means are provided for accurate positioning of a series of charts so that comparative analyses of the charts may be made.

Seventh, to provide an analyzer which incorporates unique and accurate means for accomplishing the combined arcuate and translatory movement of the chart.

With the above and other objects in view as may appear hereinafter, reference is directed to the accompanying drawings in which:

FIGURE 3 is a fragmentary, transverse sectional view taken through 3—3 of FIGURE 1.

FIGURE 4 is an enlarged fragmentary, sectional view taken through 4—4 of FIGURE 1.

FIGURE 5 is an enlarged fragmentary, sectional view taken through 5—5 of FIGURE 6.

FIGURE 6 is a fragmentary, sectional view taken through 6—6 of FIGURE 5.

FIGURE 7 is a fragmentary, sectional view taken through 7—7 of FIGURE 6.

Figure 1:
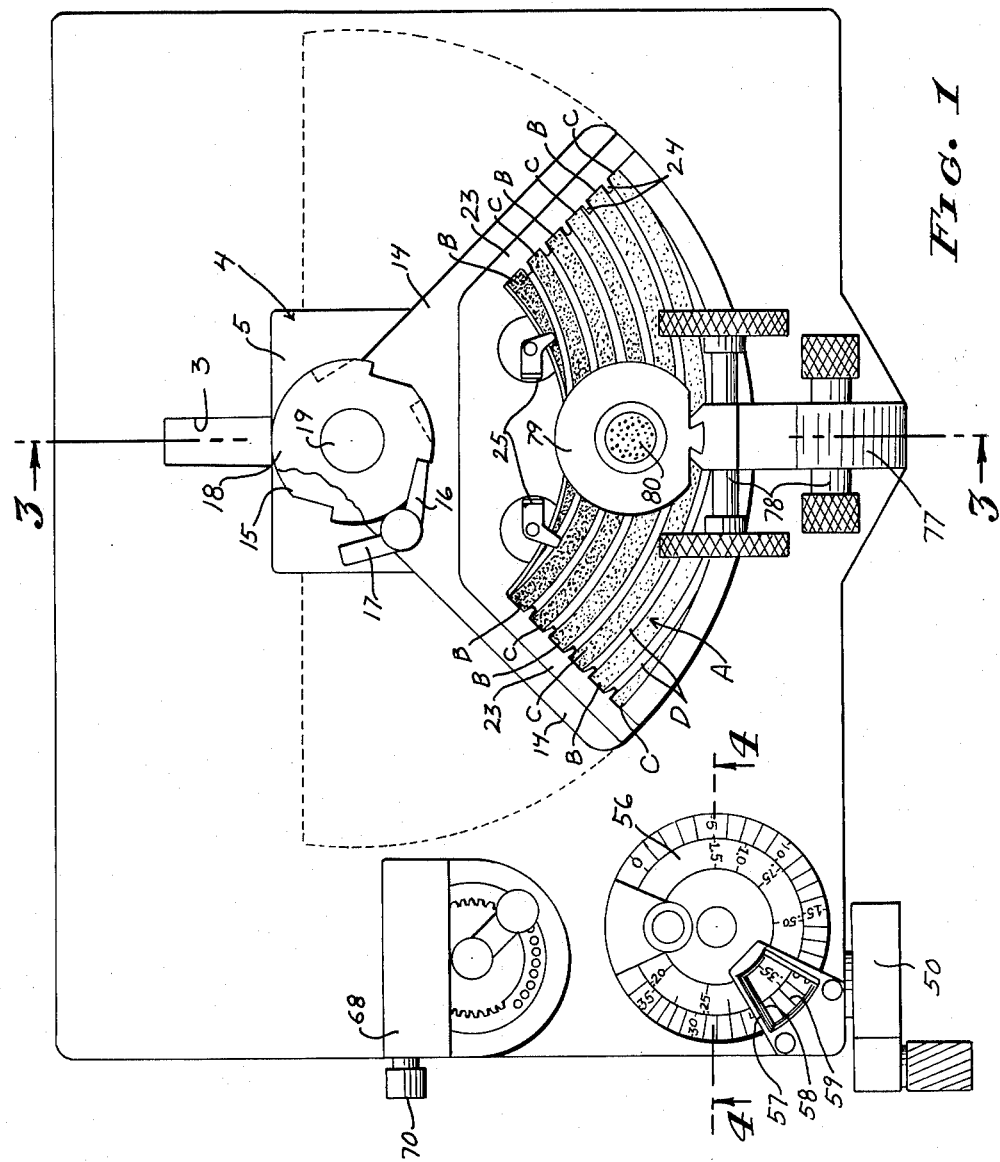
FIGURE 1 is a top or plan view of the analyzer.
Figure 2:
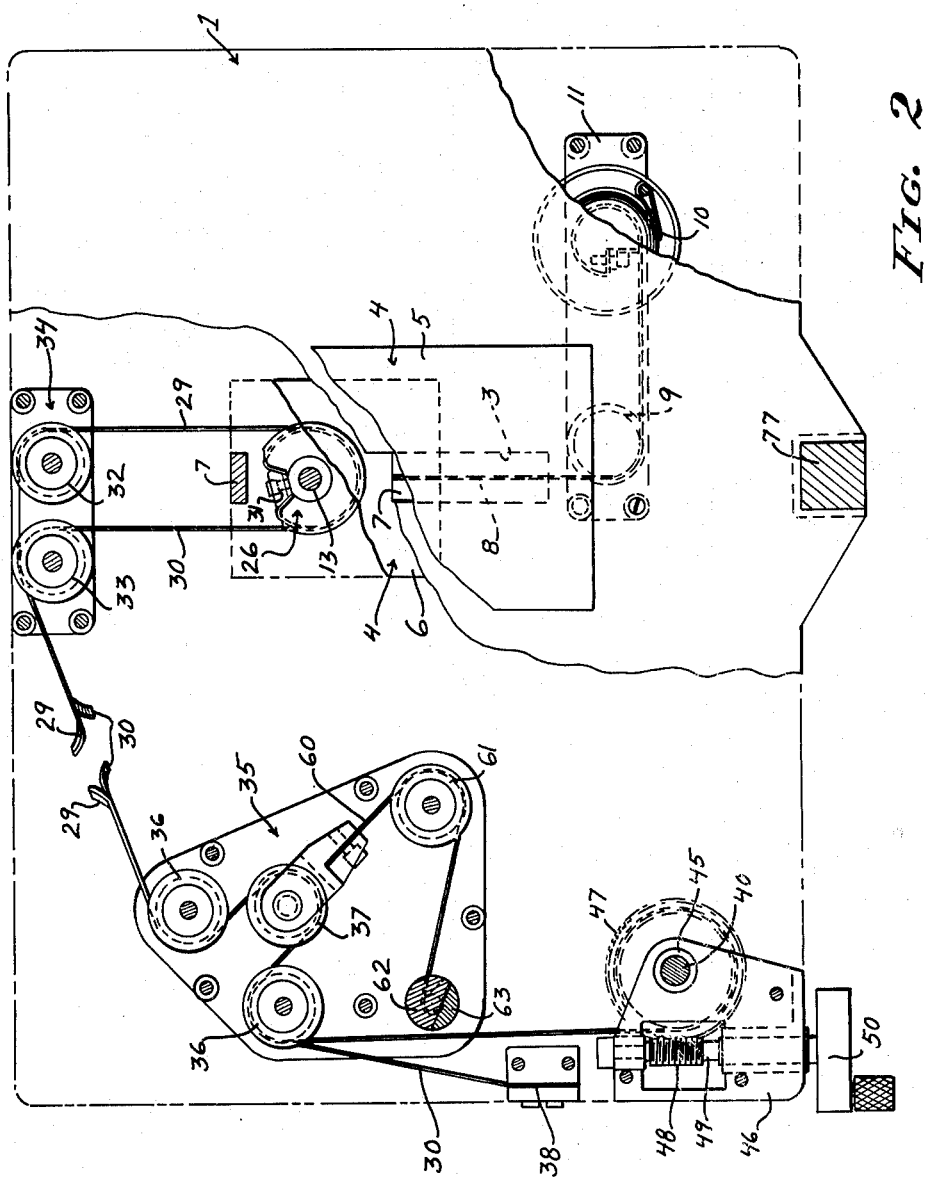
FIGURE 2 is a partial plan, partial sectional view thereof taken partly in the plane immediately above the table and partly in a plane immediately below the table to illustrate the underlying mechanism.

The analyzer for particle spectrometer charts includes a table 1 which may be rectangular in form and supported on legs 2. The table is provided with a transverse slot 3 which guides a carriage 4 adapted to move along the slot. The carriage 4 includes an upper plate 5 disposed on top of the table 1 and a lower plate 6 disposed under the table. The plates are joined by connecting bars 7 which extend through the slot 3. The connecting bars 7 fit closely within the slot so as to eliminate side play and confine the carriage to a true linear or translatory movement.

One of the bars 7 projects below the lower plate 6 and is attached to one end of a tension band 8 which extends axially with respect to the slot 3, then passes around a pulley 9 so as to extend laterally with respect to the slot to a tension spring unit 10. The tension spring unit 10 and pulley 9 may be supported by a suitable frame 11 secured to the under side of the table 1.

The carriage 4 is provided with a vertical bearing 12 which extends through the table 1. The bearing 12 journals a shaft 13 which passes upwardly through a chart mounting plate 14 supported on the upper plate 5 of the carriage. Mounted on the chart plate 14 is a ratchet disk 15 which is secured to the shaft 13. A pawl 16 having a hand lever arm 17 is mounted on the chart plate 14 for engagement with the ratchet disk 15 so as to permit pre-determined angular adjustment of the chart plate 14 relative to the shaft 13.

The ratchet disk 15 is provided with two sets of ratchet notches. In order to select one or the other set of notches a selector disk 18 is mounted on the ratchet disk 15. The selector disk is provided with one set of notches which by turning the selector disk 18 may be brought into registry with either set of notches on the ratchet disk 15. This is accomplished by turning a handle 19 which projects upwardly from the selector disk. The handle is provided with a bore which receives a spring 20 engageably with a head 21 provided at the upper end of the shaft 13 so as to urge the selector disk 18 against the ratchet disk 15. A ball detent means 22 enables the selector disk to be moved to either of its positions with respect to the ratchet disk 15. The chart mounting plate 14 is segmental in form occupying approximately a quarter circle. The chart plate is adapted to receive a frame 23 defining an arcuate space dimensioned to receive a chart A of arcuate form. The chart A, which will be described in more detail hereinafter, includes two sets of spiral band segments B and C containing the information to be analyzed. These band segments are separted by space bands D. The radially outer extremity of each segment of one set coincides with a radially outer end of the succeeding band segment of the same set.

The chart A is held in place by fixed retainer clips 24 at the circumferential extremities of the frame 23 which coincide with the hands of the space bands D. Movable retainer clips 25 which may be pivotally mounted engage the radially inner margin of the chart.

The shaft 13 projects below the bearing 12 and attached to the lower end of the shaft is a drum 26 having an upper band groove 27 and a lower band groove 28. The band grooves receive respectively an upper band 29 and a lower band 30. The bands are wrapped in opposite directions about the drum and their extremities are anchored to one side thereof by a clamp means 31. The bands 29 and 30 extend from diametrically opposite sides of the drum in parallel relation to each other. One band passes about a single pulley 32 and both bands pass about a double pulley 33. The pulleys are journalled in a frame 34.

The bands 29 and 30 after passing about the double pulley 33 are in vertical alignment with each other and extend towards a second pulley frame 35 disposed under the table 1 laterally of the carriage 4. The pulley frame 35 carries a pair of fixed double pulleys 36 disposed in spaced relation to each other. The bands 29 and 30 pass around the first of these pulleys, then around a traveling double pulley 37 and then around the second of the fixed double pulleys 36. The lower band 30 continues from the second double pulley and is secured by an anchor block 38 to the under side of the table 1.

The upper band 29 extends from the second double pulley 36 to a measuring drum 39 located adjacent one corner of the table 1. The measuring drum 39 is mounted on a shaft 40 which extends upwardly through a bearing 45. The shaft and bearing project through the table 1. The bearing 45 is supported by a bracket structure 46 which may be incorporated in the adjacent corner leg of the table.

Also mounted on the shaft 40 is a worm gear 47 which may be integral with the measuring drum 39. The worm gear is engaged by a drive worm 48 carried by a shaft 49 supported by the bracket structure 46. One end of the shaft 49 protrudes from the corresponding edge of the table 1 and is provided with a crank disk 50.

The upper end of the vertical shaft 40 terminates in a clutch disk 51 which may be disposed between clutch washers 52 that are in turn adapted to be clamped between upper and lower clamp disks 53 and 54. A set screw 55 extends between the clamp disks so that the shaft 40 may be engaged or released.

Monuted on the upper clamp disk 53 is a linear measuring dial 56 having a scale thereon which will be described in more detail hereinafter. A bracket 57 overlies one portion of the dial 56 and is provided with a viewing plate 58 having a reference line 59 for the purpose of reading the scale on the dial 56.

The traveling double pulley 37 is connected to a tension band 60 which passes around a pulley 61. The extended end of the tension band 60 is wrapped about a drum 62 of small effective diameter and is secured thereto by clamp means 63. The drum is disposed at the lower end of the shaft 64 which projects upwardly through the table 1 and through a sleeve 65. Secured to or forming an integral part of the sleeve 65 is a segmental worm gear 66 which is engaged by a worm 67 mounted in a housing 68 secured to the top of the table 1. The worm is mounted on a worm shaft 69 having a knob 70 at one axial end.

Secured to the worm gear 66 and sleeve 65 is a quadrant member 71 having a series of perforations 72 disposed in concentric relation to the shaft 64. Secured to the upper end of the shaft 64 is a hand lever 73, the extremity of which slidably receives a pin 74 the lower end of which is reduced to fit into one of the perforations 72. The pin is urged downwardly into engagement with a selected perforation 72 by means of a spring 75. A knob 76 at the upper end of the pin 74 permits the pin to be raised and moved from one perforation to the other.

Mounted upon the radially outer side of the chart plate 14 and extending upwardly from the table 1 is a bracket 77 having vertical adjustment means 78 and arranged to support a scanning device 79. The scanning device may be a microscope or other device such as an electronic counter or other device suitable for examining, analyzing or counting bits of information which may be contained on the bands B and C of the chart. If the device is a microscope, cross lines 80 may be provided for locating points on the chart.

The chart A, as illustrated, is one which is obtained from a particle spectrometer of the type shown in patent application, Serial No. 759,680 now Patent No. 3,074,627 filed September 9, 1958, entitled Means and Method of Separating Particles from Fluids, Alexander Goetz, inventor.

The chart is so formed that its ends may be brought together to form a cone frustrum which is clamped between inner and outer frusto-conical parts which mate one within the other. The chart lines the inner wall of the outer part of the rotor. The inner part of the rotor is provided with one or more (in actual practice two) helical channels leading from inlets at the smaller end of the rotor to outlets at the larger end of the rotor. The chart covers these channels to define the band segments B and C. The walls separating the rotor channels cover the space bands D of the chart.

Particle laden fluid is introduced at the inlets of the rotor and flows through the helical channels to the outlets of the rotor. The rate of flow is so controlled as to maintain a laminar flow. Simultaneously, the rotor is turned at high speed so that the particles contained in the fluid are driven by centrifugal force against the chart covered walls. These particles adhere to the chart by molecular attraction or by reason of adhesive properties inherent in the surface of the chart.

The particles are distributed along the chart with the greater concentration near the inlet end. The distribution, size and other characteristics of the deposit of particles reveals much useful information concerning the particles.

The chart A, when unrolled and flattened subtends an arc of approximately 90°. If, initially, the chart is fitted in a rotor having two helical paths, the chart will have, when unrolled, two sets B and C of segmental spiral bands, wherein the radially outer extremity of one segment matches radially with the radially inner end of succeeding segment of the same set.

Operation of the analyzer for the purpose of studying the particles or other deposits on the chart A, is as follows:

The chart A is placed on the holder or chart mounting plate 14 as shown in FIG. 1 under the viewing axis of a microscope, microscope camera, scanning device or other conventional device 79 which facilitates study of the deposits on the bands B and C. The center of the arc defined by the chart A coincides with the center of rotation of the shaft 13, drum 26 and holder 14.

If the upper tension band 29 connected with the measuring drum 39 is caused to unwrap therefrom by operation of the crank disk 50, and the other band 30 remains fixed, the drum 26 undergoes simultaneously a rotational and translational movement. A relationship between these movements is predetermined by the size of the drum 26 such that the chart mounting plate 14 is moved in a spiral path. That is, the chart is caused to traverse the viewing axis of the device 76 in a path within a selected band segment B or C.

The drum 26 has a full rotational movement of approximately three-fourths of a circle and a translation movement corresponding to the radial width of the chart, in order to confine the movement of the chart to the approximately 90° arc subtended by the chart. The chart mounting plate or holder 14 may be advanced or retarded by shifting the position of the pawl 16 relative to the ratchet disk 15.

By reading the dial 56 the linear distance of the viewing axis from an end of a selected set of bands B or C may be determined as indicated by the outer scale 56a of the dial 56. If the deposits on the chart are particles of random size in the micron range, they will be classified as to size, the smaller particles being farthest from the inlet ends or radially inner ends of the bands B or C. If the deposits are made under controlled conditions, then a scale 56b indicating particle size may be provided on the dial 56.

In order to locate the viewing or scanning axis radially with respect to a selected land segment the knob 70 is rotated to operate the tension band 60 and move both bands 28 and 29 an equal amount so as to cause a translation movement of the drum 26; and a radial movement of the chart A. Once the viewing axis has been located with respect to the margins of a band segment, all of the segments of the selected set may be passed under the viewing axis and the particles along a line at a known location parallel to the margins of the band segment set may be studied.

Having thus described certain embodiments and applications of my invention, I do not desire to be limited thereto, but intend to claim all novelty inherent in the appended claims.

I claim:

1. An analyzer for arcuate charts having a radially related series of spiral band segments containing information wherein the radially inner end of a preceding spiral segment has a radius identical to the radially outer end of a succeeding spiral segment to be analyzed, said analyzer comprising: an arcuate supporting plate for said arcuate chart; a scanning device disposed over said chart and having means defining a fixed reference point; a pivot means for said plate disposed at the center defined by said plate; means for turning said pivot means and plate; means for effecting a translation movement of said pivot means, said turning means and translating means being interconnected to cause said fixed reference point to describe a line following the path of a selected band as said chart is moved by said means under said scanning device; and means for adjusting said plate circumferentially independently of said turning and translating means to shift said chart from the inner radial end of a preceding segment to the outer radial end of a succeeding segment.

2. An analyzer for arcuate charts having spiral band segments containing information to be analyzed, said analyzer comprising: a supporting plate for said chart; a carriage for said plate to effect a translating movement of said plate and chart; a pivot means connecting said plate to said carriage to effect arcuate movement of said plate and chart about the axis defined by said arcuate chart; yieldable means urging said carriage and pivot means in a direction radially of said pivot means; opposed tension elements connected with said pivot means for turning said pivot means in opposite directions, one of said tension elements having a fixed extended end, the other of said tension elements having an extendable and retractable extended end; means for extending and retracting said other tension element thereby to cause simultaneous rotation and radial movement of said pivot means and to cause a selected spiral band segment to move while remaining in registry with a fixed point.

3. An analyzer for arcuate charts having a series of radially related spiral band segments: a table; a support for said chart mounted on said table, said support having a pivotal axis coinciding with a center defining by said arcuate chart, and movable about said pivotal axis and as well as radially with respect to said axis; a scanning device fixed to said table with respect to the directions of movement of said support for examination of selected small areas of said chart; means for effecting simultaneous pivotal and radial movement of said chart with respect to said scanning device proportioned to cause a selected spiral band segment to pass under said scanning device; means for moving said support and chart radially to select a spiral band segment; and means for effecting radial adjustment of each spiral band segment with respect to said scanning device.

4. An analyzer for charts of arcuate configuration having thereon a set of spiral band segments containing information distributed serially from one band segment to the next, said analyzer comprising: a table; a support for said chart mounted on said table, said support having a pivotal axis coinciding with a center defined by said arcuate chart, and movable about said pivotal axis and as well as radially with respect to said axis; a scanning device fixed to said table with respect to the directions of movement of said support for examination of selected small areas of said chart; means for moving said support arcuately relative to said pivot to select one of said set of spiral band segments; and means for effecting simultaneous pivotal and radial movement of said chart with respect to said scanning device proportioned to cause a selected spiral band segment to pass under said scanning device.

5. An analyzer for charts of arcuate configuration having thereon a set of spiral band segments containing information distributed serially from one band segment to the next, said analyzer comprising: a table; a support for said chart mounted on said table, said support having a pivotal axis coinciding with a center defined by said arcuate chart, and movable about said pivotal axis and as well as radially with respect to said axis; a scanning device fixed to said table with respect to the directions of movement of said support for examination of selected small areas of said chart; means for moving said support arcuately relative to said pivot to select one of said set spiral band segments; means for effecting simultaneous pivotal and radial movement of said chart with respect to said scanning devices proportioned to cause a selected spiral band segment to pass under said scanning device; and means for effecting radial adjustment of each spiral band segment with respect to said scanning device.

6. An analyzer for charts of arcuate configuration having thereon a set of spiral band segments containing information distributed serially from one band segment to the next, said analyzer comprising: scanning device adapted to be disposed over said chart to facilitate examination of a small area thereof; means for effecting movement of said chart for selecting one of said set of spiral band segments; means for effecting movement of said chart along a path defined by a selected spiral band segment; and means for determining the position of every point of the chart in terms of the arc length of the spiral measured from a reference point independent of the geometry of the chart.

7. An analyzer for charts of arcuate configuration having thereon a set of spiral band segments containing information distributed serially from one band segment to the next, said analyzer comprising: scanning device adapted to be disposed over said chart to facilitate examination of a small area thereof; means for effecting movement of said chart for selecting one of said set of spiral band segment; means for effecting movement of said chart along a path defined by a selected spiral band segment; means for effecting movement of said chart for selecting areas disposed at different distances from the sides of the selected spiral band segment; and means for determining the position of every point of the chart in terms of the arc length of the spiral measured from a reference point independent of the geometry of the chart.

8. An analyzer for a chart having a spiral band; scanning device adapted to be disposed over said chart to facilitate examination of a small area thereof; means for effecting movement of said chart along the path defined by said spiral band; means for determining the position of every point of the chart in terms of the arc length of the spiral measured from a reference point independent of the geometry of the chart.

9. An analyzer for a chart having a spiral band; scanning device adapted to be disposed over said chart to facilitate examination of a small area thereof; means for effecting both radial and arcuate movement of said chart along the path defined by said spiral band; means for effecting movement of said chart for selecting areas disposed at different distances from the margins of said spiral band; and means for determining the position of every point of the chart in terms of the arc length of the spiral measured from a reference point independent of the geometry of the chart.

References Cited by the Examiner

UNITED STATES PATENTS

| | | | |
|---|---|---|---|
| 1,208,573 | 12/16 | Kitsee | 88—18.8 |
| 1,708,533 | 4/23 | Bettini | 88—18.8 |
| 2,584,052 | 1/52 | Sandorff | 235—92 |
| 2,831,252 | 4/58 | Weischelbaum | 33—125 |
| 2,994,856 | 8/61 | Dickinson | 274—10 |
| 3,025,605 | 3/62 | Leeper et al. | 33—125 |

MALCOLM A. MORRISON, *Primary Examiner.*

WALTER W. BURNS, JR., *Examiner.*